United States Patent [19]
Wright

[11] Patent Number: 5,938,519
[45] Date of Patent: *Aug. 17, 1999

[54] POST POULTRY WASHER

[75] Inventor: Donald Wright, Villa Rica, Ga.

[73] Assignee: SEC, Inc., Dallas, Ga.

[ * ] Notice: This patent issued on a continued prosecution application filed under 37 CFR 1.53(d), and is subject to the twenty year patent term provisions of 35 U.S.C. 154(a)(2).

[21] Appl. No.: 09/035,100

[22] Filed: Mar. 5, 1998

[51] Int. Cl.⁶ .................................................. A22C 21/04
[52] U.S. Cl. .............................................. 452/173; 452/77
[58] Field of Search ................................ 452/173, 74, 76, 452/77

[56] References Cited

U.S. PATENT DOCUMENTS

| | | |
|---|---|---|
| 2,562,556 | 7/1951 | Kurt . |
| 2,820,245 | 1/1958 | Turner . |
| 3,689,958 | 9/1972 | Dillon . |
| 4,279,059 | 7/1981 | Anderson et al. . |
| 4,337,549 | 7/1982 | Anderson et al. . |
| 4,862,557 | 9/1989 | Clayton et al. . |
| 5,178,890 | 1/1993 | van den Nieuwelaar et al. . |
| 5,312,293 | 5/1994 | Rankin et al. . |
| 5,482,503 | 1/1996 | Scott et al. . |
| 5,484,332 | 1/1996 | Leech et al. . |

*Primary Examiner*—Willis Little
*Attorney, Agent, or Firm*—Eric P. Schellin

[57] ABSTRACT

Poultry are thoroughly cleaned after being sequentially treated along a conventional endless poultry line by the post poultry washer of the present invention. The device consists of a two rows of vertical conduits at oppositably disposed positions with vertically staggered spray nozzles. Special detailed three member vertical baffles are positioned in back of the said spray nozzles. The baffles and associated spray nozzles cause a vortex of spray washer water to encircle each fowl that is moved through the post poultry washer apparatus wherein the wash water collectively contact all exposed surfaces of the carcass.

5 Claims, 3 Drawing Sheets

POST POULTRY WASHER

BACKGROUND OF THE INVENTION

The present invention relates to a novel apparatus and method for washing poultry to minimize the risk of contamination to humans. More specifically, the invention comprises utilizing a novel space efficient apparatus to adequately treat an eviscerated bird by applying spray of water to all surfaces of the bird.

Modern poultry operations for processing chicken, turkey, duck or other poultry process birds through an automated system of slaughter, evisceration, cleaning and packaging. Due to its very nature, the process of evisceration exposes the exterior body surfaces and inner body cavities of the birds to the contents of the digestive tract, In so doing, the bird is exposed to potentially pathogenic microorganisms.

DISCUSSION OF THE PRIOR ART

In the slaughtering of poultry the following actions generally take place in succession: stunning, cutting the throat, followed by bleeding, scalding (immersing the poultry in hot water at about 50° C. for several minutes), plucking, opening up the carcass, eviscerating (removal of the entrails), and possibly jointing of the poultry into end products, such as fillets, drumsticks and the like.

During the above-mentioned operations the poultry must be contaminated as little as possible in order to obtain end products, which can be stored a long time without unacceptable loss of quality. In particular, certain parts of the skin are susceptible to contamination, which means that special attention must be paid to decontamination of the skin.

It has been found that a major source of contamination of the skin, in particular by bacteria, is due to the features of the poultry. The feathers are heavily soiled, partly as result of the transportation of the poultry from growing farm to slaughterhouse, tightly packed together in stacked cages, during which the poultry come into contact not only with droppings of other birds in the same crate, but also with droppings of birds in a crate higher up.

Although the feathers are removed by plucking the slaughtered birds, a large number of bacteria such as, for example, Salmonella, Campylobacter and Listeria (pathogenic bacteria, in other words, bacteria which can cause illnesses in human beings) and also Pseudomonas (bacteria which can adversely affect the quality, in particular the smell of the meat) still remains on the skin of the birds.

Another important contamination of the skin is cause by the removal of the entrails out of the birds.

Different methods and apparatuses are known for the decontamination of the poultry during scalding or plucking, or after evisceration has taken place. A disadvantage of the decontamination during scalding or plucking is the presence of the heavily soiled feathers containing many bacteria, which makes decontamination in this stage of the slaughtering process difficult. The same applies to decontamination after evisceration, because of the contact of the entrails with the skin.

While a number of prior art workers have made contributions to the poultry technology as seen from their patents. None as made as much of a contribution as Lacy Simmons has is the patentee in a great number of patents, to wit:

U.S. Pat. No. 5,178,579 entitled: Poultry washer.
U.S. Pat. No. 5,178,578 entitled: Poultry crop remover
U.S. Pat. No. 4,910,829 entitled: Poultry cropper and neck breaker
U.S. Pat. No. 4,739,539 entitled: Method and apparatus for removing fecal matter from poultry
U.S. Pat. No. 4,730,365 entitled: Poultry neck breaker assembly
U.S. Pat. No. 4,707,886 entitled: Poultry oil sac removal method and apparatus
U.S. Pat. No. 4,694,535 entitled: Post stunner for poultry
U.S. Pat. No. 4,694,534 entitled: Apparatus for electrically stunning poultry
U.S. Pat. No. 4,619,017 entitled: Poultry processing apparatus
U.S. Pat. No. 4,550,473 entitled: Poultry processing method and apparatus
U.S. Pat. No. 4,532,676 entitled: Poultry oil sac removal method and apparatus.

These patents are incorporated herein by their entireties.

SUMMARY OF THE INVENTION

The object of the invention is to reduce the number of bacteria growing on the end products of slaughtered poultry and to retain the freshness of these products during a relatively long period of storage.

This object is accomplished by the apparatus of the present invention which is a post poultry washer, i.e. a device for spraying poultry with water from all angles after the conventional treatment of poultry. The device is positioned as one more treatment station along a conventional poultry line which delivers shackled poultry hanging from an endless chain into and out of various treatment stations.

In the present device, the post poultry washer consists of a pair of two vertically disposed and horizontally displaced conduits which are fixed with a plurality of angled downwardly extending spray nozzles. The spray nozzles on each conduit are staggered with regard to one another along a vertical line. The spray nozzles of one conduit are also mounted whereby these sprays intersect along an angle from each other and are detailed to intersect at the locus of a bird when it moves along the advancing line.

The said mentioned two conduits have a baffle assembly behind the said conduits and spray nozzles. The assembly consists of a three panels, consisting of a side panel at each side of the central panel, integrally connected with one another. The central baffle is parallelly disposed to the line of travel of the poultry line. The side panels on either side of the central baffle are at an acute angle to the central baffle, is a direction towards each other.

The assembly just described and detailed is reproduced in mirror image on the other side of the poultry line including the baffle. The said panels of the baffles have angled downwardly extending portions to direct effluent water into a receiving sump.

DETAILED DESCRIPTION OF THE DRAWINGS

Figure 1:
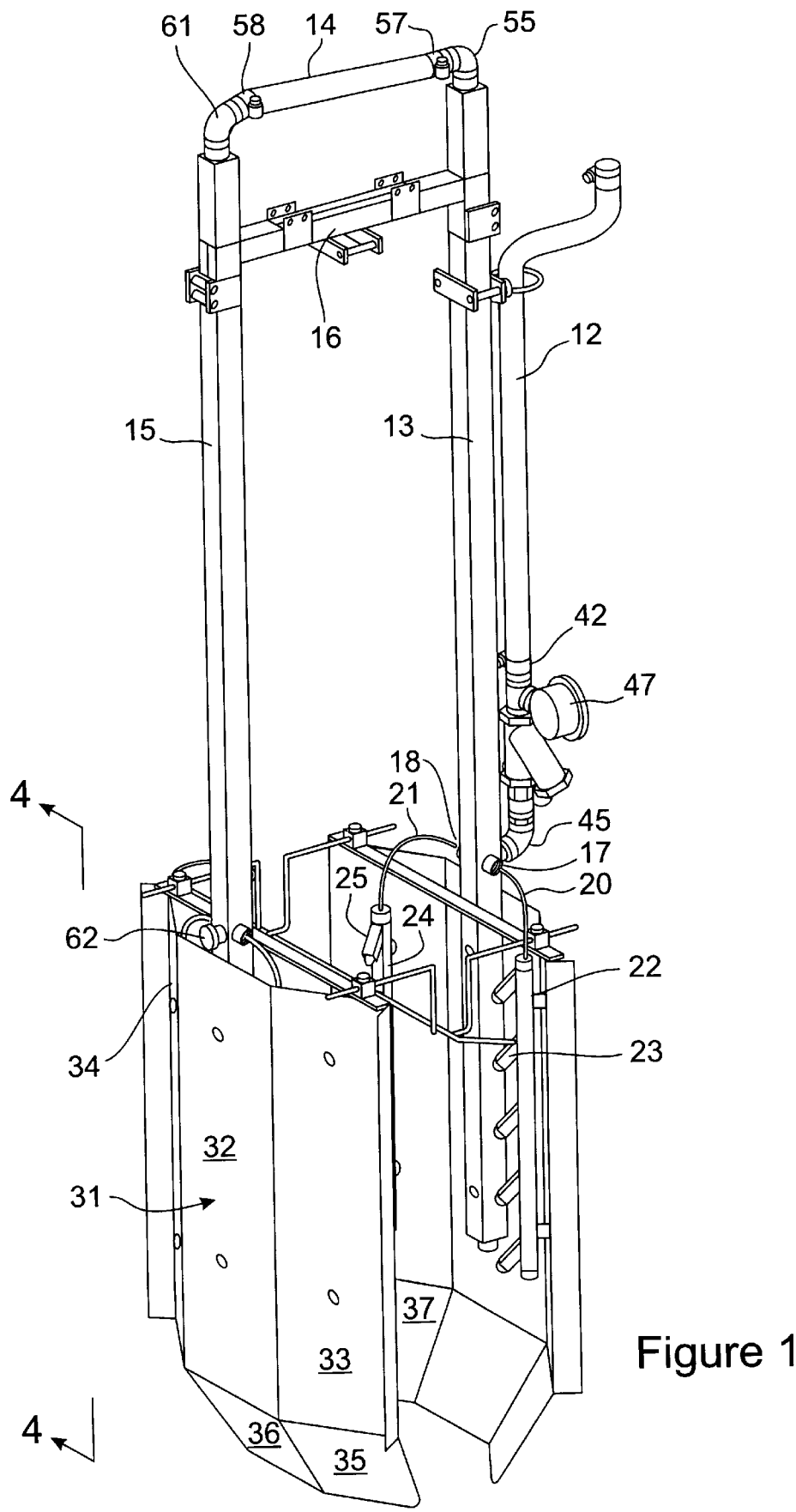
FIG. 1 is a perspective of the poultry washer of the present invention.
Figure 4:
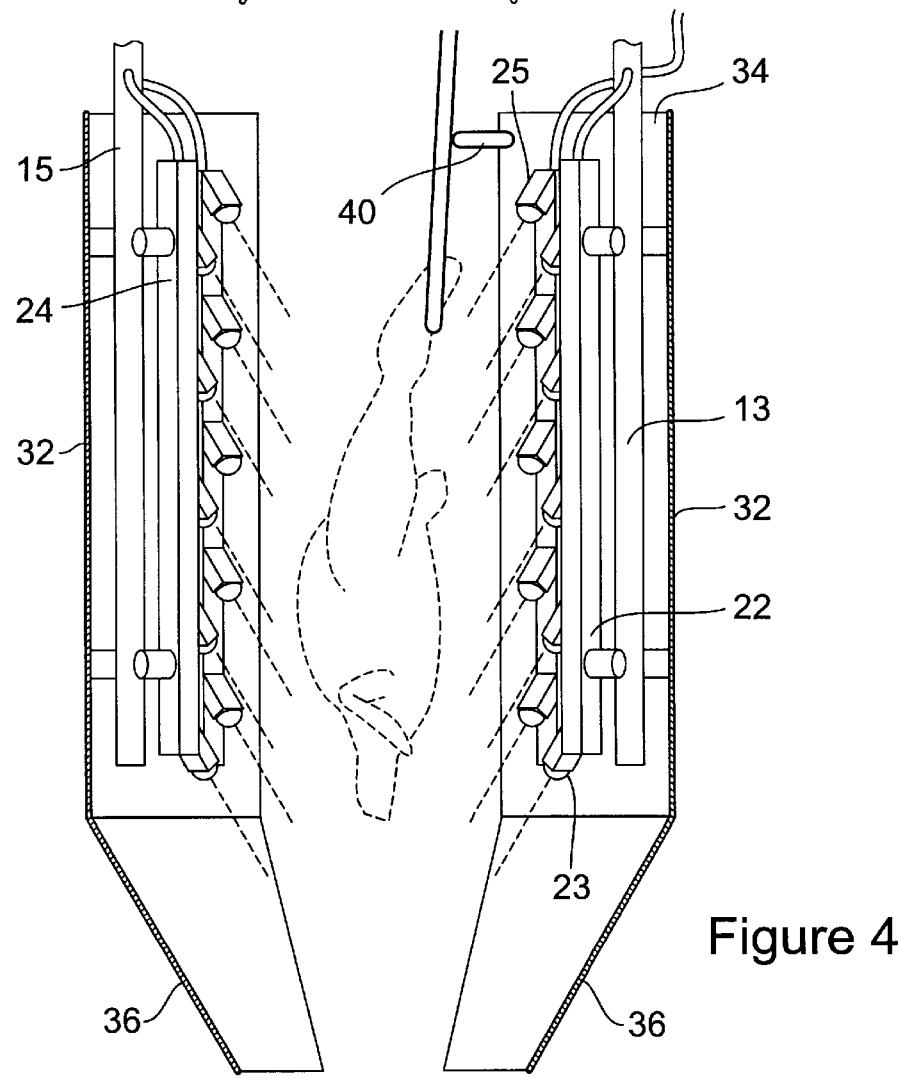
FIG. 4 is a fragmental and cross-sectional view of the poultry washer taken along lines 4—4 of FIG. 1.

The post poultry washer of the present invention is shown, generally, in FIG. 1 and is identified by reference numeral 11. As shown in FIG. 4, for instance, the poultry washer is detailed whereby a poultry carcass in a conventional shackle is carried on a conventional endless chain between a two sided washer assembly.

Returning to FIG. 1, a water carrying conduit 12 is operatively connected to a vertical carrying conduit 13 which is operatively connected to a bridge water carrying conduit 14 which is operatively connected to a vertically downwardly disposed water carrying conduit 15. The bridge water carrying conduit 14 is located above a cross member 16 which is attached to a conventional endless chain (not shown) to which a conventional poultry carrying shackle is attached which shown fragmentally in FIG. 4. Conduit 13 is provided with intermediate connections 17 and 18 at opposite sides. Water carrying conduit 20 is operatively attached at one end to connection 17. Water carrying conduit 21 is operatively attached at one end to connection 18. The other end of conduit 20 terminates in a vertically disposed conduit 22 having a plurality of vertically displaced downwardly extending water spray nozzles 23. Likewise, the other end of conduit 21 terminates in a vertically disposed conduit 24 having a plurality of vertically displaced downwardly extending water spray nozzles 25. Vertically disposed conduit 22 and vertically disposed conduit 24 are horizontally displaced from each other along a vertical plane.

The spray nozzles 23 and spray nozzles 25 are mounted at their respective vertically disposed conduits whereby they are directed at angles which intersect at an area where the poultry traverses. Additionally, it is a feature of the invention that the spray nozzles 23 mounted to conduit 22 are offset, i.e., staggered with respect to the spray nozzles 25 mounted to conduit 24.

The assembly of conduits and spray nozzles being supplied by conduit 1S is a mirror image of the conduits being mounted to and supplied by conduit 13.

The juxtaposition of the disposition of the two assemblies is to insure complete spraying of the fowl from both sides.

Besides the feature of the staggered positioning of the spray nozzles 23 and 25, both assemblies have a unique vertical disposed baffle system generally, 31 behind the respective water spray assemblies. The baffle system includes three sections. A central baffle 32 is vertically disposed and is in a plane which is horizontally disposed with regard to the plane of travel with regard to the poultry.

At each side are vertically disposed baffles 33 and 34 which are at angles whereby they are folded towards one another. Each of the baffles 33 and 34 are at angles of approximately displacement of 32° from the plane as described by the central baffle 32. This angularity can be readily seen from FIG. 3.

Figure 3:
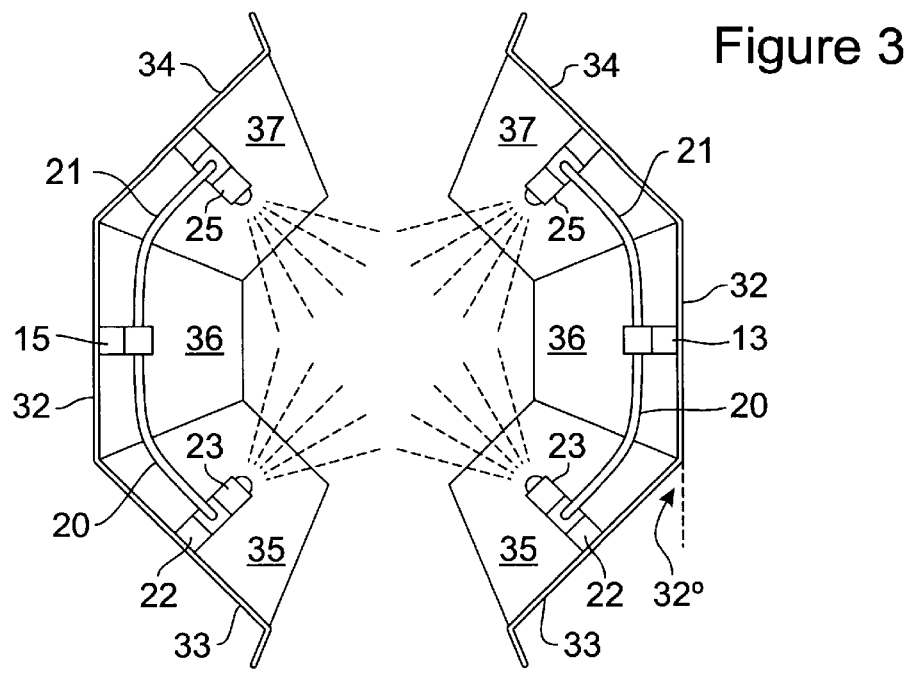
FIG. 3 is a cross-sectional view of the poultry washer taken along lines 3—3 of FIG. 2.

Each of the panels 32, 33 and 34 terminate in inwardly depending portions 35, 36 and 37, respectively, which especially can be best seen in FIG. 3. These portions are designed primarily to direct the sprayed wash water centrally to a gathering area above a catch basis (not shown) from whence the used wash water is sewered.

The staggered positioning of the nozzles as detailed in the above together with the unique baffles location and angles therebetween results in not only an extremely effective spray pattern but also the establishment of a vortex of spray water that swirls about the fowl in order to distribute water with considerable force against the bird.

Figure 2:
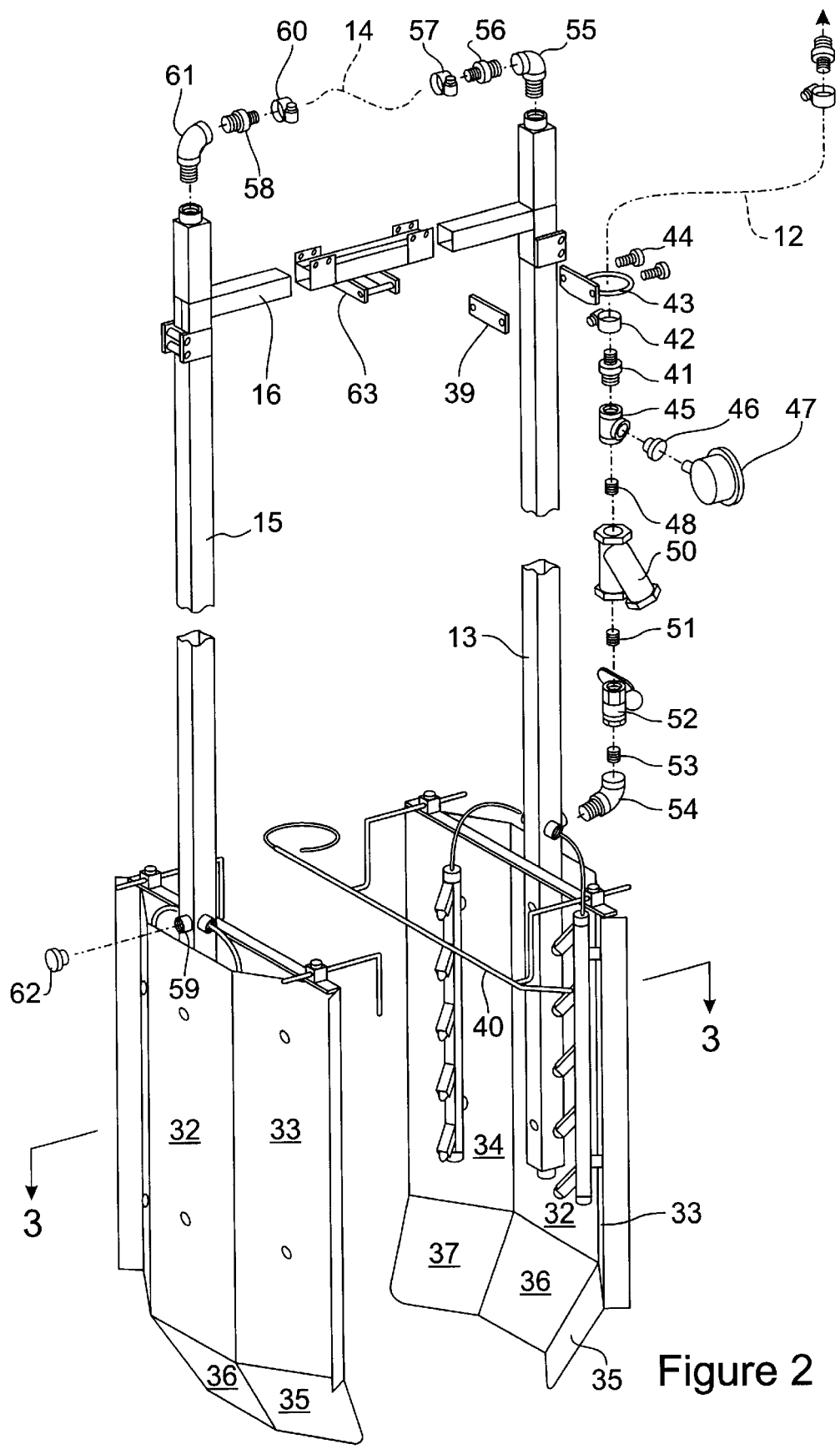
FIG. 2 is the same perspective view as FIG. 1 with the piping for the poultry washer being exploded.

FIG. 2 shows an exploded view of the plumbing of the device. Note also the horizontally disposed guide 40 designed to hold the poultry retaining shackle from striking the spray nozzles. Conduit 12 is a flexible hose which is affixed to a connector 41 with a conventional clamp 42. The conduit 12 is held in place by a hose guide weldment 43 which is held in place by screws 44 against a back plate 39. Connector 41 is connected to a tee 45 into which a bushing 46 is fitted. The bushing 46 carries a conventional gauge 47 having a face dial showing 0–160 psi. The other end of the tee 45 is connected to a nipple 48 which in turn is secured to a Y strainer 50. The lower part of the Y strainer 50 is connected to a nipple 51 which in turn is connected to a ball valve 52. The ball valve 52 is connected to a nipple 53 which in turn is connected to a 90° ell 54. The 90° ell 54 is fluidly connected to vertical conduit 13.

The conduit 13 terminates at the top thereof with a 90° ell 55 which in turn is fluidly connected to a connector 56 which is connected to one end of a hose 14. The hose 14 is secured to the connector 56 by a hose clamp 57 having a worm drive.

The other end of the hose 14 is likewise connected to a connector 58 by means of a hose clamp 60. The connector 58 is fluidly connected to a 90° ell 61, the end of which is fluidly connected to vertical conduit 15, which supplies water to the oppositely disposed spraying assembly. A cap 62 closes the conduit 15 at a port 59 whereby the various fluid connections can be mounted to conduit 15, if desired and needed.

A center clamp assembly 63 is mounted to cross bridge 16 to which an existing endless claim is secured (not shown).

The washer apparatus of the present invention may be constructed of any approved materials (particularly USDA approved materials) such as stainless steel or USDA approved thermoplastics. Particularly preferred is 10 to 20 gauge stainless steel.

Typical pump sizing provides for up to 50 gallons per minute with heads of up to 30 to 40 feet or a gauge pressure at gauge 47 of up to 75 p.s.i. The quantity of water is sufficient whereby with the placement of the spray nozzles and the said baffles a vortex of water ensures a sufficient force to produce a low pressure aura about the washer.

Having described the invention in detail and by reference to the preferred embodiments thereof, it will be apparent that modifications and variations are possible without departing from the scope of the appended claims.

What is claimed is:

1. An apparatus for washing treated poultry for use in combination with conventional overhead endless chain and shackles conveyor system having a line of travel of said treated poultry, said apparatus comprising:

a first vertically disposed spray conduit assembly at one line of travel, a second vertically disposed spray conduit assembly at the same line of travel, said first vertically disposed spray conduit assembly and said second vertically disposed spray conduit assembly being fluidly connected to a source of wash water under pressure, said first vertical disposed spray conduit assembly and said second vertically disposed spray conduit assembly each having a plurality of spray nozzles, said plurality of spay nozzles of said first vertically disposed spray conduit assembly being staggered vertically with respect to said plurality of spray nozzles of said second vertically disposed spray conduit assembly, said spray nozzles of said first conduct assembly and said spray nozzles of said second conduit assembly being directed at an angle whereby a spray of said first conduit assembly intersect with a spray of said second conduit assembly at the line of travel of said poultry, a baffle assembly horizontally displaced and behind said first and said second conduit assemblies, said baffle assembly having a first vertical panel, said first vertical panel being parallel to the line of travel of said treated poultry, said baffle assembly having a second vertical panel and a third vertical panel, said second panel being attached along a vertical edge to one vertical edge of said first panel and at an angle with respect to said first panel, said third panel being attached along a vertical edge to the other vertical edge of said first panel and at an angle with respect to said first panel, said second panel and said third panel are positioned towards each other and towards said first spray conduit assembly and said second spray conduit assembly.

2. The apparatus of claim 1 wherein there is a mirror-image of the elements of said first spray conduit assembly, second spray conduit assembly, and said fabble assembly at an opposite side of the line of travel.

3. The apparatus of claims 1 or 2 wherein the first, second and third panels of the baffle assemblies terminate downwardly and inwardly with panel extension whereby to direct the used wash water to a collection area.

4. The apparatus of claims 1 or 2 wherein the second panel and the third panel are at an angle of about 32° C. with respect to the first panel.

5. The apparatus of claims 1 or 2 wherein the angle of the spray nozzles of the first conduit assembly and spray nozzle of the second conduit assembly is 45°.

\* \* \* \* \*